United States Patent

[11] 3,554,252

[72] Inventors: Mariano V. Artiaga, Winnetka; Arthur Storrie, Chicago; Brian P. Suzik, Fox Lake, Ill.
[21] Appl. No. 724,093
[22] Filed Apr. 25, 1968
[45] Patented Jan. 12, 1971
[73] Assignee Kitchens of Sara Lee, Inc. a corporation of Maryland

[54] METHOD AND APPARATUS FOR DEPITTING PIT-CONTAINING FRUIT MATERIAL
3 Claims, 3 Drawing Figs.

[52] U.S. Cl.................................................. 146/18, 146/23, 146/237, 146/238
[51] Int. Cl................................................... A23n 3/00
[50] Field of Search..................................... 146/17, 18, 23, 25, 237, 238

[56] References Cited
UNITED STATES PATENTS
| | | | |
|---|---|---|---|
| 1,307,692 | 6/1919 | Northrop..................... | 146/17 |
| 1,361,765 | 12/1920 | Jennings..................... | 146/18 |

Primary Examiner—Willie G. Abercrombie
Attorney—Dressler, Goldsmith, Clement & Gordon ABSTRACT: Described herein is a method and apparatus for depitting fruit such as cherries, apricots and the like. The fruit, which may be precooked, is conveyed to a pair of members such as a pair of rollers defining a gap between them, which gap is slightly less than the smallest dimension of the pit in particular fruit. The rollers are counterrotated and the fruit supplied at the throat of the rollers leading to the gap is passed through the gap between the rollers, the pits remaining behind. The fruit meat is conveyed to a suitable receptacle and the pits are collected from the vicinity of the rollers and intermittently removed therefrom.

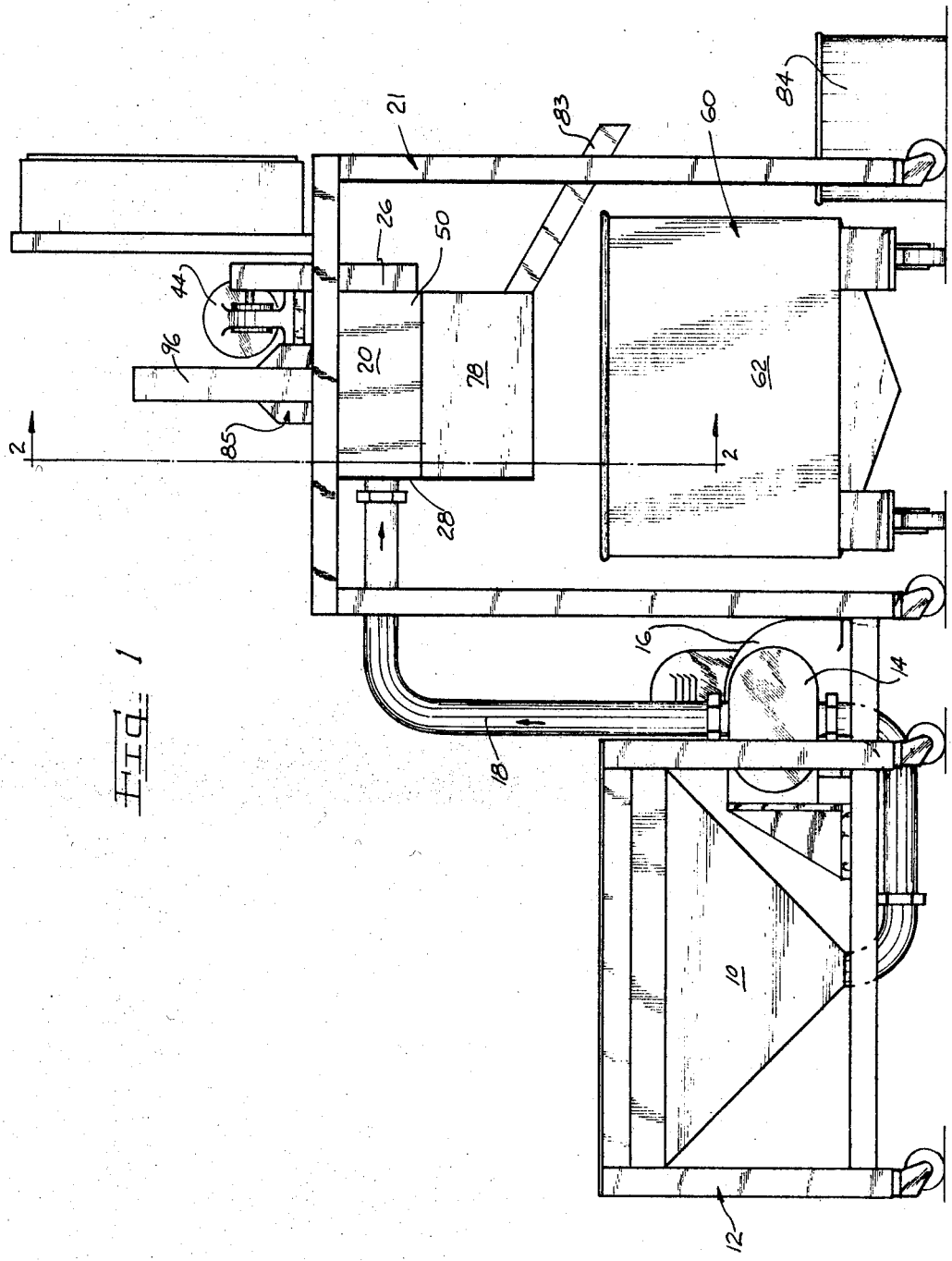

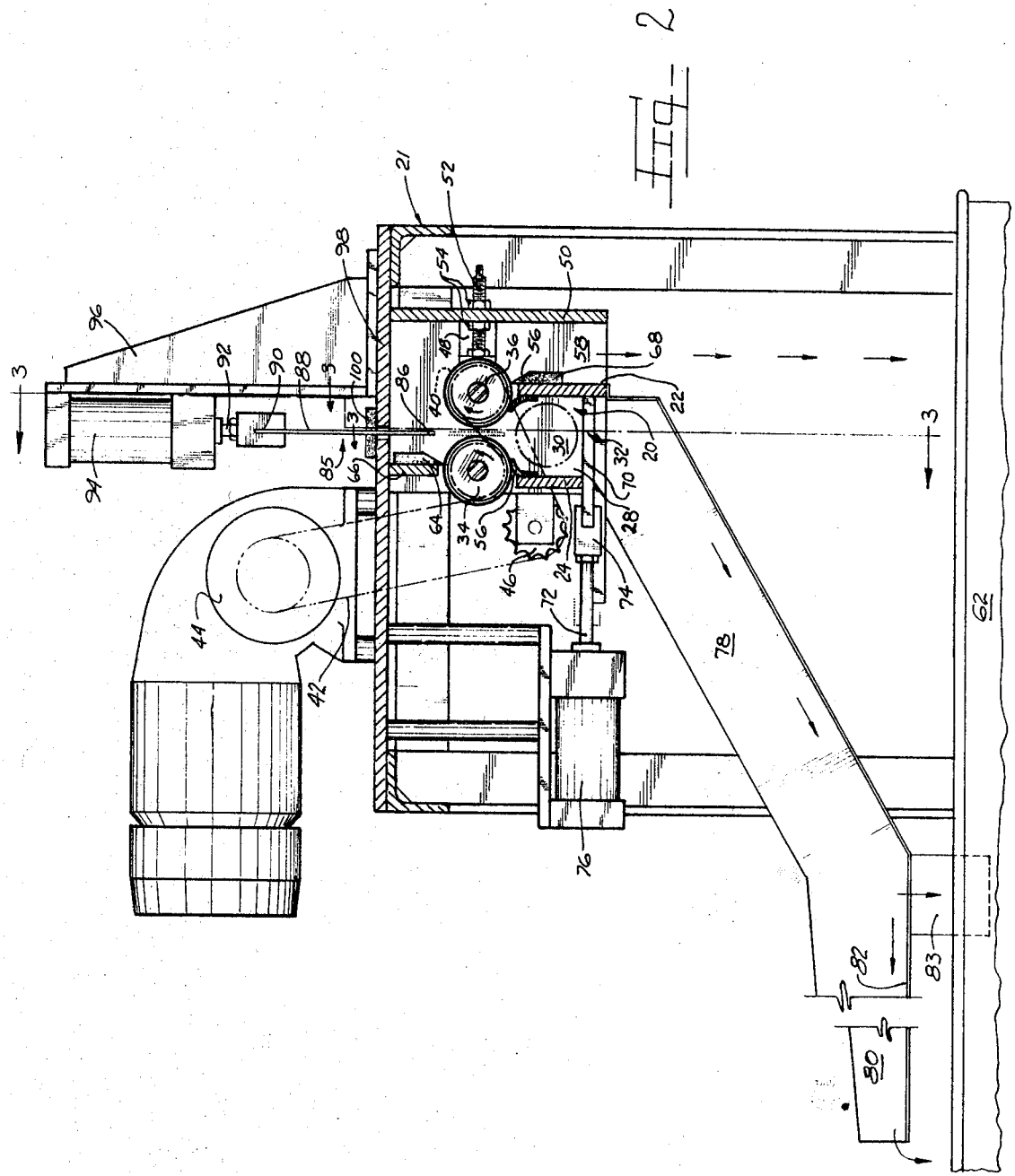

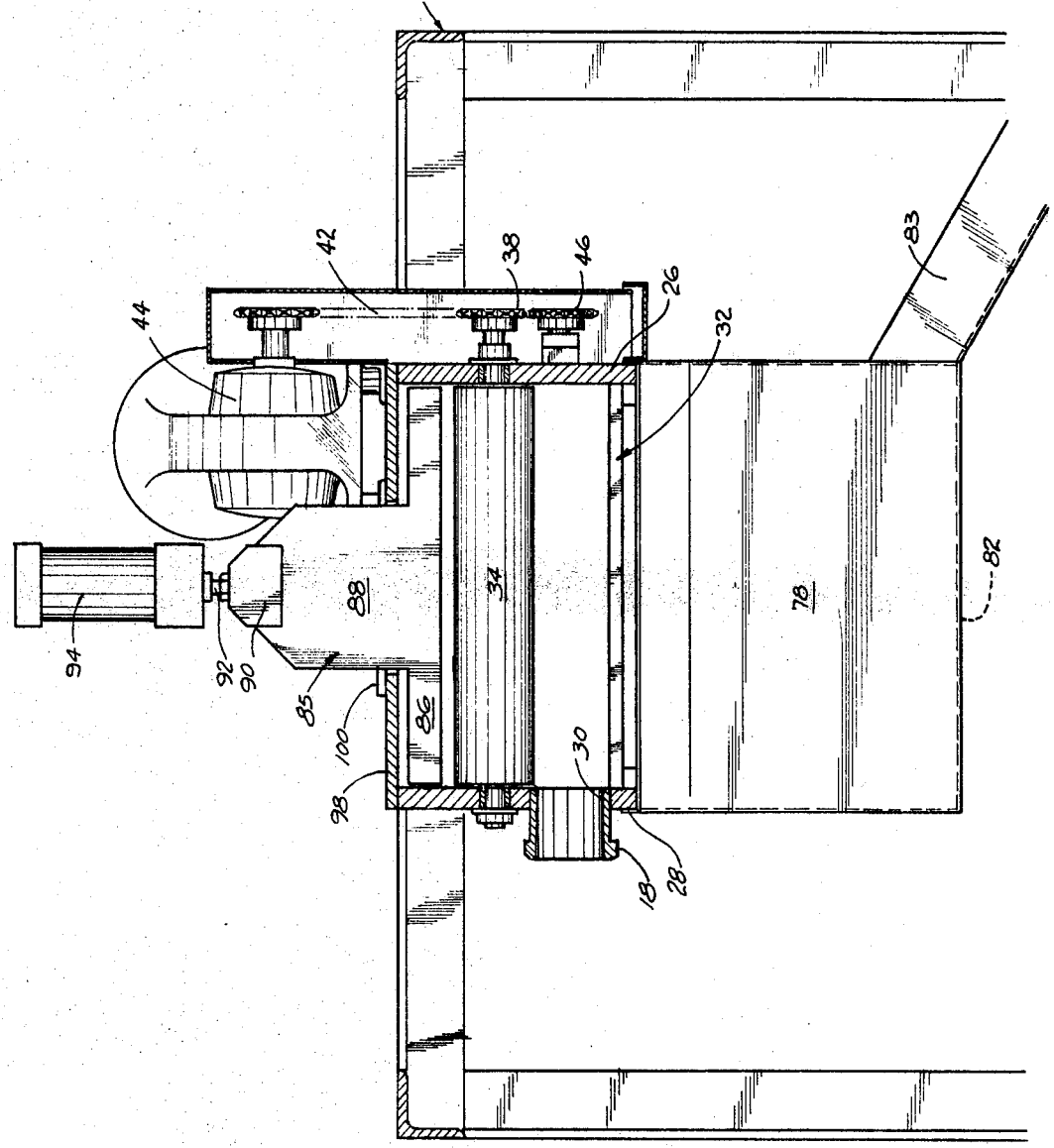

METHOD AND APPARATUS FOR DEPITTING PIT-CONTAINING FRUIT MATERIAL

BACKGROUND

There are many environments in which depitted fruit such as cherries, apricots, peaches and the like are desired. In many of those environments it is essential that all of the pits be removed largely because the consumer expects each and every piece of fruit to be pitless. For example, cherry cheese cake and other pastries utilizing whole cherries should be completely pit free. If they are not, a consumer is likely to bite or swallow the pit resulting in consumer dissatisfaction and action or complaint against the purveyor or manufacturer.

Various means have been devised for removing pits from fruit beyond the obvious, tedious and uneconomic hand removal method. For example, one method involves the cutting of the fruit followed by mechanical plunging of the pit from the fruit. This, of course, yields fruit pieces rather than whole pitted fruit. The method and means disclosed herein provides a vastly improved and simplified procedure for removing the pits from fruit, such as whole fruit, leaving the fruit meat substantially intact.

SUMMARY

This invention provides an improved method and means for removing pits from fruit, such as from whole cherries, apricots and the like, rapidly and efficiently and without requiring complicated or elaborate machinery. It removes all of the pits, thereby assuring the user that the fruit meat supplied to the ultimate consumer will be pit free minimizing possible consumer dissatisfaction and complaint.

In accordance with this invention the fruit to be depitted is acted upon by presenting pit containing fruit to pressure applying means, the meat being passed through a gap defined by a pair of spaced apart surfaces, the gap being smaller than the smallest dimension of the fruit pits. If a pit is within the fruit, it is ejected through the surface of the fruit as the meat is passed through the gap, the fruit meat being collected from one side of the pressure applying means, the pits being collected on the other side. All of the pits whether in the interior of the fruit or in the fruit material outside the fruit meat are thus removed. The meat, particularly where the fruit is cooked, remains substantially intact.

Apparatus suitable to practice the method of this invention includes a pair of adjacent, spaced apart rollers. The rollers are mounted so that their adjacent faces are parallel and define a gap which is less than the smallest dimension of the fruit pits. The gap, of course, will depend upon the size of the pits and the fruit to be depitted. The rollers are caused to rotate in a counterrotating fashion, i.e., the adjacent surfaces move in the same direction, each of the surfaces thereby cooperating to move opposite sides of the fruit meat in the same direction and without damaging the fruit meat.

In one embodiment the rollers are positioned at the top of a fruit supply chamber. The chamber is continuously fed with sufficient unpitted fruit to fill the chamber and to supply the throat of the rollers. The term throat is used herein to signify the area from the lower surface of rollers leading to the gap. Then the fruit meat is passed upwardly through the throat and between the roller gap and discharged to a collecting means over the top of the rollers. The fruit pits are retained in the chamber, the ratio of pits to unpitted fruit gradually increasing.

Periodically the pits are removed from the chamber. This is accomplished by providing the chamber with an openable floor which permits dumping of the contents of the chamber. Means for opening the floor are provided, preferably operable at the same time the means for continuously feeding the chamber with unpitted fruit is deactivated. To assist in the dumping and to facilitate cleaning of the gap and throat, a purge plate is actuatable simultaneously with the floor opening to thrust downwardly through the gap and into the chamber, thereby cleaning the rollers and purging the chamber of the accumulated pits.

In that fashion the pits are removed from unpitted fruit or a pit containing mass of fruit simply, rapidly and completely, thereby assuring the processor that possible complaints and dissatisfaction of consumers of the treated fruit will not result from the presence of pits in the products in which the treated fruit is used.

Numerous other advantages and features of this invention will become apparent from the following description of the invention and of a presently preferred embodiment thereof, and from the drawings of which:

FIG. 1 is side elevation of an apparatus of this invention adapted to carry out the method of this invention;

FIG. 2 is an enlarged view, partially in section, taken substantially along the line 2—2 of FIG. 1; and FIG. 3 is an enlarged view, partially in section, taken substantially along the line 3—3 of FIG. 2.

Referring now to FIG. 1, pit containing fruit material, such as cooked or preserved cherries, is supplied to the depitting apparatus from a hopper 10 supported on a frame 12, which may be a movable cart. Although preserved cherries will be referred to herein in conjunction with the method and apparatus of this embodiment, it is to be understood that other cooked, uncooked or preserved pit containing fruit material may be treated similarly. So that the cherries may be pumped, in the manner described in connection with this embodiment, they are in a fluid carrier, such as a syrup.

The cherries supplied to hopper 10 are then pumped under pressure by a supply pump 14 operated by a motor 16 through a conduit 18 into a chamber 20 supportingly connected to a frame assembly 21. Chamber 20 is defined by elongated upstanding sidewalls 22 and 24, respectively, end wall 26 and end wall 28 to which conduit 18 is connected. End wall 28 defines an opening 30 in flow communication with conduit 18. The bottom or floor 32 of chamber 20 comprises a movable plate, the function and operation of which will be described hereinafter.

The top of chamber 20 is defined by a pair of spaced apart gap-defining surfaces. These surfaces preferably comprise a pair of rotatable members such as cylinders or rollers 34 and 36 which are rotatably supported on suitable bearing means. Roller 34 is supported on end walls 26 and 28. Preferably rollers 34 and 36 are of a sanitary material, such as stainless steel. Each of the rollers is provided with a drive sprocket 38 and 40, respectively. Drive sprockets 38 and 40 are driven by a chain 42 from a motor 44, the chain 42 passing over an idler sprocket 46 suitably secured to frame assembly 21. It is to be noted that chain 42 engages sprockets 38 and 40 to drive them and the associated rollers in a counterrotating fashion as indicated by the arrows in FIG. 2. Thus the rollers are disposed to allow material to pass upwardly out of chamber 20 through the gap between the rollers as material is supplied to the roller throat.

Roller 36 is adjustably mounted to vary the gap between it and roller 34. Thus roller 36 is rotatably supported on a pair of brackets 48 (only one being illustrated), brackets 48 being movable toward and away from frame member 50 by threaded bolt means 52. Bolt 52 is securely fastened to a frame assembly member 50 by nuts 54, thus adjustably fixing the space or gap between rollers 34 and 36.

As unpitted fruit is supplied to chamber 20 through opening 30, the rollers are caused to counterrotate upwardly as illustrated and described. Preferably, the cherry material is pumped into the chamber so as to flow upwardly between the rollers at a flow rate approximately equal to the speed of the rollers at their surfaces. That relationship will minimize possible damage to the fruit as it enters the throat and passes through the gap between the rollers. The rollers are spaced apart to define a gap between their surfaces which is less than the smallest dimension of the pits of the fruit to be depitted. As fruit is continuously fed upwardly to the throat of the rollers it is contacted by the rollers and the fruit meat is forced upwardly through the throat and through the gap, thereby gradually applying pressure to the fruit containing a pit between a pair of opposite sides and from a leading edge toward the other end of the fruit. Because the rollers are spaced apart a distance less than the smallest dimension of the fruit pit, a pit contained within a piece of fruit is gradually forced through the fruit meat toward its trailing end, and is then ejected through the trailing edge and surface of the fruit to leave the pits behind the roller gap. If the pits are outside the fruit meat, they will similarly be retained in the chamber.

To maintain the integrity of the chamber, elongate, flexible and sanitary seals 56 are provided below each roller. They prevent passage of fruit and pits between the upper edges of sidewalls 22 and 24 and the opposed spaced surfaces of rollers 34 and 36. These seals are suitably mounted, as by screws, to the sidewalls to be readily removed for cleaning and replacement as they wear out.

As seen in FIG. 2, pitted fruit passes upwardly between the rollers, over the surface of the rollers and down through passageway 58 into a collecting receptacle which may be a caster-supported cart 60 having an open topped hopper 62. To assure conveyance of all of the pitted fruit through passageway 58, a doctor or wiper 64 is provided at the top of roller 34. Any fruit that roller 34 tends to carry upwardly is thus scraped from its surface back into the upper throat of the rollers to tumble over roller 36 for discharge through passageway 58. Wiper 64 is suitably secured to frame assembly 21, as to a depending frame plate 66 by screws means (not shown). Wiper 64 is adjustable downwardly and is readily and easily removed for cleaning and replacement.

A further doctor or scraper 68 is positioned adjacent sidewall 22 for scraping engagement with roller 36. Any pitted fruit which tends to cling to the roller and which would otherwise be carried back into the chamber, is scraped from the surface of roller 36 by scraper 68 to be discharged through passageway 58. Each of the scrapers 64 and 68 and seals 56 extends along the entire length of the roller surface to act upon the entire roll with which they are respectively associated.

It is apparent that as a quantity of fruit passes through the gap between the rollers, the ejected pits accumulate in chamber 20, gradually increasing the ratio of pits to unpitted fruit therein. It is, therefore, necessary to remove the pits periodically. To that end the chamber floor 32, as stated, is openable. Floor 32 comprises a reciprocable floor plate 70 secured to a shaft 72 by a connecting member 74. Shaft 72 is connected to a piston (not shown) housed within cylinder 76. When the floor is to be opened, cylinder 76 is operated to draw shaft 62 to the left (as seen in FIG. 2) to bring the connecting member and plate 70 to the position illustrated in dotted line in FIG. 2. When that is done chamber 20 becomes bottomless and the contents drop downwardly into chute 78 and chute extension 80.

As best seen in FIG. 2, cart hopper 62 extends below passageway 58 to receive that which is discharged therethrough. Hopper 62 also may extend beyond the end of chute extension 80 so that part of the material dropped through the chamber floor may be directed thereinto. As seen, chute extension 80 defines an elongate horizontal surface 82. Initially, that which is dropped through the chamber bottom comes to rest on that surface. The pits may then be removed manually and dropped through funnel 83 into a pit receptacle 84. Alternatively, the entire content of the chamber which passes through the chamber bottom may be dropped into a temporary waste receptacle to be handled elsewhere.

To assist in purging the chamber and to clean the throat and gap of the rollers of accumulated fruit, fruit meat and pits, a purge plate 85 is positioned to be reciprocated downwardly to the dotted line position illustrated in FIG. 2. Purge plate 85, as best seen in FIG. 3, includes a broad purging segment 86 which is movable downwardly through the gap and into the chamber, an upstanding connector segment 88, secured as by fork block 90 to a shaft 92. Shaft 92 is operatively secured to a piston (not shown) housed within cylinder 94. Cylinder 94 is mounted on support member 96 of frame assembly 21. To minimize the possibility of carrying fruit meat upwardly through top plate 98 of frame assembly 21, a wiper 100 is positioned adjacent the opening in top plate 98 through which purge plate 85 extends.

In operation, cherries or other fruit are supplied to hopper 10. They are pumped under pressure through conduit 18 into chamber 20. As chamber 20 fills, counterrotating rollers 34 and 36 allow fruit meat to pass upwardly through the gap between them retaining the pits in the chamber. The cherry material, being fed to the chamber, thereby is pressure urged into the throat and through the gap, the counterrotating rollers assisting in drawing and passing the fruit meat through the gap. The rollers which counterrotate may be free wheeling, although they are preferably driven and preferably at a surface speed substantially equal to the flow rate of the cherry material supplied to the throat. Periodically a purge phase is initiated. At that time the pump and rollers are stopped. Then the cylinders 76 and 94 are actuated, thereby withdrawing floor plate 70 and moving purge plate 85 downwardly to evacuate chamber 20 and clean the confronting surfaces of rollers 34 and 36. When the chamber has been emptied, cylinders 76 and 94 are reversed, the chamber floor closes, purge plate 85 is withdrawn, pump 14 starts pumping again and the rollers are rotated. This depitting portion of the cycle continues until another purge phase is instituted. The intermittent operation of the pump and rollers for the pitting and purging cycles may be manually controlled or may be controlled by a suitable timer (not shown) which activates and deactivates switches (not shown) in timed sequence and in the sequence and manner described.

In this manner pits are surely and completely removed from the associated fruit meat and periodically and automatically removed from the system. The fruit meat is separated in substantially intact form from the pits and is continuously and automatically conveyed to a collection vessel for use as and when desired.

It is apparent that pits may be removed from fruit other than cherries. Adjusting bolt means 52 provide for varying the gap or space between the rollers depending upon the size of the fruit and pits. A suitable spacing for cherries has been found to be about three-sixteenths inch, although this may vary with the size of the cherries used. It is also clear that the apparatus and method of this invention may be used where some, but not all, of the pits are within the fruit when the fruit is presented to the rollers for separation from the pits. It is also clear that the apparatus and method may be used to remove pits from fruit material that has already had the bulk of the pits removed to make certain that all of the pits are removed from the fruit prior to use, and where some of the pits are within the fruit and some without the fruit meat, but in the fruit material supplied to the apparatus.

The foregoing description and drawings illustrate and describe a presently preferred embodiment of this invention. It will be apparent to those skilled in the art that modifications may be made in the particular embodiment in accordance with the spirit and scope of the invention. Therefore, the description and drawings are intended to be illustrative of only and not limiting on the scope of the invention as defined in the appended claims.

We claim:

1. In a pitting machine for seperating pits from pit containing fruit material, a roller, a parallel surface spaced apart from said roller a distance less than the smallest dimension of a pit, said roller and said spaced apart surface defining a throat and a gap therebetween, means supporting said roller for rotation, means for supplying pit containing fruit material to said throat, said roller passing fruit meat through said throat and said gap to convey said fruit meat to a receptacle, and means for accumulating said pits on the other side of said gap, and wherein said roller and spaced apart surface overlie a chamber and said supplying means feeds said chamber, said chamber comprising said means for accumulating said pits below said throat and said fruit meat passes upwardly through said throat and said gap to be conveyed to said receptacle, and wherein said chamber further includes an openable floor and means for opening said openable floor to purge the chamber of its contents, and wherein said pitting machine further includes reciprocable purging means conjointly operable with said means for opening said openable floor, said purging means comprising a plunger plate movable downwardly through said gap into said chamber.

2. In a pitting machine for seperating pits from pit containing fruit material, a pair of parallel rotatable roller members, said rotatable members being spaced apart a distance less than the smallest dimension of the pits in said fruit material, means for counterrotating said rotatable members upwardly with respect to each other at their throat, a chamber below said rotatable members for receiving fruit material and for feeding fruit material to the throat of said rotatable members, whereby fruit meat is passed upwardly between the rotatable members, leaving the pits behind, said pits remaining in said chamber until said chamber is emptied, said fruit meat passing upwardly and over said rotatable members into a fruit meat collection means, said chamber including means for purging said chamber, said means comprising an operable chamber floor through which the chamber contents may be dumped and means for moving said openable door between closed and open positions, said purging means further comprising a purge plate reciprocably movable downwardly into the space between said rollers and into said chamber when said means for moving said openable floor are operated to open said floor.

3. In a machine for separating pits from fruit meat, conduit means for feeding pit containing fruit to a chamber, means defining a chamber for receiving said pit containing fruit, said chamber having a movable floor, a pair of rotatably mounted parallel rollers, said rollers being spaced apart a distance less than the smallest dimension of the pits in said pit containing fruit, means for counterrotating said rollers so that the adjacent surface of said rollers rotate upwardly to pass the fruit meat through the gap between them while ejecting the pits into said chamber and to transfer said fruit meat out of said chamber, said rollers being positioned at the top of said chamber to define a top for said chamber, means for intermittently moving said floor to an open position to drop accumulated pits and fruit out of said chamber, and purge plate means intermittently operable to project downwardly between the spaced rollers and into said chamber simultaneously with said floor moving means to purge the chamber and clear the confronting roller surfaces of fruit, fruit meat and pits.